US007194791B2

(12) United States Patent

Shigeta et al.

(10) Patent No.: US 7,194,791 B2

(45) Date of Patent: Mar. 27, 2007

(54) TURN-TABLE TYPE ROLL STOCK APPARATUS AND PLATING FACTORY FOR PROCESS ROLL FOR GRAVURE PRINTING

(75) Inventors: Tatsuo Shigeta, Nagareyama (JP); Shigeru Suzuki, Kashiwa (JP)

(73) Assignee: Think Laboratory Co., Ltd. (JP)

( * ) Notice: Subject to any disclaimer, the term of this patent is extended or adjusted under 35 U.S.C. 154(b) by 192 days.

(21) Appl. No.: 10/774,409

(22) Filed: Feb. 10, 2004

(65) Prior Publication Data

US 2004/0173064 A1 Sep. 9, 2004

(30) Foreign Application Priority Data

Feb. 24, 2003 (JP) ............................ 2003-045305

(51) Int. Cl.
*B23B 15/00* (2006.01)
*B65B 61/00* (2006.01)

(52) U.S. Cl. .......................... 29/33 R; 29/564; 29/33 P

(58) Field of Classification Search .................. 29/564, 29/33 P, 33 R; 53/448, 587; 101/3.1, 401.1
See application file for complete search history.

(56) References Cited

U.S. PATENT DOCUMENTS

| | | | | |
|---|---|---|---|---|
| 4,836,468 | A * | 6/1989 | Singer | 242/131 |
| 5,052,540 | A * | 10/1991 | Matsuyama et al. | 29/33 P |
| 5,107,904 | A * | 4/1992 | Van Mullekom | 139/450 |
| 5,244,160 | A * | 9/1993 | Hinchliffe et al. | 242/473.5 |
| 5,323,178 | A * | 6/1994 | Mohnkern et al. | 347/262 |
| 5,624,082 | A * | 4/1997 | Ligon | 242/131 |
| 6,122,896 | A * | 9/2000 | Weder et al. | 53/399 |
| 6,772,493 | B2 * | 8/2004 | Yamanashi et al. | 29/33 P |
| 6,911,300 | B2 * | 6/2005 | Sato et al. | 101/153 |
| 2004/0200692 | A1 * | 10/2004 | Tanaka | 198/349 |

FOREIGN PATENT DOCUMENTS

| | | | |
|---|---|---|---|
| DE | 2618112 | A * | 11/1977 |
| JP | 61238640 | A * | 10/1986 |
| JP | 2002265009 | A * | 9/2002 |
| JP | 2004223751 | A * | 8/2004 |
| JP | 2004232028 | A * | 8/2004 |

* cited by examiner

*Primary Examiner*—Dana Ross
(74) *Attorney, Agent, or Firm*—Rader, Fishman & Grauer PLLC

(57) ABSTRACT

There are provided a plating factory for process roll for a gravure printing and a turn-table type roll stock apparatus preferable to the gravure printing plate manufacturing factory where a series of plating steps can be performed against the process roll for the gravure printing in an unmanned state at night in a full-automatic operation and the cell can be formed. Many process rolls can be stood obliquely in a circumferential arrangement in one stage or two stages at a roll pallet in such a way that a longitudinal direction of the process rolls may coincide with a generatrix at a conical surface and an optional roll pallet can be stopped at a predetermined position so as to store or take out the process rolls in respect to the roll pallet.

4 Claims, 11 Drawing Sheets

TURN-TABLE TYPE ROLL STOCK APPARATUS AND PLATING FACTORY FOR PROCESS ROLL FOR GRAVURE PRINTING

BACKGROUND OF THE INVENTION

1. Field of the Invention

This invention relates to a turn-table type roll stock device which is preferable to a plating factory for process roll for a gravure printing, which is capable of performing a series of plating steps against the process roll for a gravure printing in a full-automatic unmanned operation at night, and a plating factory for the process roll for a gravure printing.

2. Description of the Related Art

The prior art gravure printing plate making step for a direct plate type process roll is comprised of some steps of loading—chromium peeling—correction grinding/cell image cutting and grinding—degreasing—washing—acid pickling—washing—copper sulphate plating—grinder stone grinding—coating and forming of negative type photosensitive film—image printing by a laser exposure device—developing—etching—resist peeling—chromium plating—paper grinding—and unloading.

In addition, this prior art gravure plate making step is comprised of some steps of loading—chromium peeling—correction grinding—cell-image cutting and grinding—degreasing—washing—acid pickling—washing—copper sulphate plating—grinder stone grinding—coating and forming of ablasion type photosensitive film—image printing (ablasion) by a laser exposure device—etching—resist peeling—chromium plating—paper grinding—and unloading.

Further, this prior art gravure plate making step is comprised of some steps of loading—chromium peeling—correction grinding/cell-image cutting and grinding—degreasing—washing—acid pickling—washing—copper sulphate plating—grinder stone grinding—engraving with an electronic engraving machine—chromium plating—paper grinding—and unloading.

As the technical documents where some gravure printing plate making steps are disclosed, it is possible to mention Japanese Patent Application No. Hei 10(1998)-193551, Japanese Patent Application No. Hei 10(1988)-193552, Japanese Patent Laid-Open No. 2000-062342, Japanese Patent Laid-Open No. 2000-062343, Japanese Patent Laid-Open No. 2000-062344, Japanese Patent Laid-Open No. 2001-179923, Japanese Patent Laid-Open No. 2001-179924, Japanese Patent Laid-Open No. 2001-187440, Japanese Patent Laid-Open No. 2001-187441, Japanese Patent Laid-Open No. 2001-191475, Japanese Patent Laid-Open No. 2001-191476, Japanese Patent Laid-Open No. 2001-260304, Japanese Patent Laid-Open No. 2002-127369, Japanese Patent Laid-Open No. 2002-187249, Japanese Patent Laid-Open No. 2002-187250, Japanese Patent Laid-Open No. 2002-200728, Japanese Patent Laid-Open No. 2002-200729, Japanese Patent Laid-Open No. 2002-307640, and Japanese Patent Laid-Open No. 2002-307641.

SUMMARY OF THE INVENTION

In order to process many process rolls under a full-automatic mode at night in an unmanned state, it is necessary that all the process rolls are stocked in a printing-plate making chamber with a processing content different in every roll being inputted and then the rolls are rapidly fed into a plating line. In addition, it is necessary that the process roll having its plating completed is delivered to the printing-plate making device in a short tact. On the other hand, a customer wants an installation of a less-expensive facility, so that it is requested in the market to provide a device compact in size.

There is a customer desiring to perform a plating processing for at least about 30 rolls at night under a full automatic operation in an unmanned state and further plating and printing plate making processing; there is a customer desiring to perform a plating processing for about 60 rolls under a full automatic operation in an unmanned state and further plating and printing plate making processing; and there is a customer desiring to perform a plating processing for about 90 rolls under a full automatic operation in an unmanned state and further plating and printing plate making processing. It becomes a problem to be solved to construct such a factory facility as one capable of fully accommodating for these customers.

To the contrary, the prior art gravure plate was constructed such that some cells are formed at a copper sulphate plating surface and a thickness of about 7 to 84 μm of chromium plating having a plate wear was adhered to the entire surface having the cells formed. Vickers hardness at this chromium plating is about 1,000.

Chromium plating solution contains hazardous compound such as sexivalent chromium compound, so that this plating solution is a cause for applying a bad influence to a working environment at a gravure printing plate manufacturing factory. Waste liquid processing for chromium plating solution has not been easily carried out and waste liquid has been collected by a recovering worker at a high cost. Chromium waste liquid of rich concentration enters into water due to a trouble accident at a waste liquid processing device for chromium plating solution and the like and so there may occur a possibility that either a soil or a river is contaminated.

Carrying-out chromium plating operation is not preferable and this is prohibited in a world-wide scale. Accordingly, it is desired that the chromium plating step, either chromium peeling at a re-use roll or cell-image cutting step including chromium plating are eliminated from the gravure printing plate manufacturing line.

It is an object of the present invention to provide a plating factory for process roll for a gravure printing, and a turn-table type roll stock device preferable to the gravure printing plate manufacturing factory in which many process rolls can be stood in a slant manner and stocked within a handling area of a reciprocatable and rotatable industrial robot enabling a roll warehouse to be conveniently realized within a small space at night, the process rolls can be delivered in a short tact, when the process rolls to be processed at night are stocked before the factory is unmanned at the evening, and some plating steps and plating print-making steps different from each other are inputted in advance in a control device, the process roll is fed into the plating line in sequence one by one under a full-automatic manner in an unmanned state at night, the processing can be carried out at the plating steps and plating print-making steps different for each of the many process rolls and all the number of plated or process rolls can be stocked, all the number of rolls can be taken out tomorrow morning and a quite high operating efficiency can be attained.

It is another object of the present invention to provide a turn-table type roll stock device capable of storing many process rolls having different sizes in a quite small space, and not fallen outwardly even under its rotatable operation; additionally to contribute to a substantial reduction of facility cost, a small space formation and an accomplishment of high efficiency in operation of an entire device at the plating factory for process roll for a gravure printing and the gravure printing plate manufacturing factory; and to contribute to an increased operating efficiency of the entire device in which a changing-over transferring of the roll can be carried out easily between the stock devices under an industrial robot even if a plurality of stock devices are installed, the industrial robot can take out rapidly any roll stocked at any location at the stock device and transfer it to a feeding position for the plating line, and a transferring tact for transferring for all rolls to which the industrial robot contributes, more practically, the plated roll, a roll being at the midway part of the print-making and the process roll to the stock device or a device around the robot can be made short.

The invention described in the first embodiment provides a turn-table type roll stock device characterized in that the same is constituted such that many process rolls can be stood obliquely in a circumferential arrangement in one stage or two stages at a roll pallet in such a way that a longitudinal direction of the process rolls may coincide with a generatrix at a conical surface and an optional roll pallet can be stopped at a predetermined position so as to store or take out the process rolls in respect to the roll pallet.

The invention described in the second embodiment provides the turn-table type roll stock device described in the first embodiment characterized in that the same is constructed such that the roll pallet is comprised of a lower supporting member having two flat surfaces for supporting the two right and left points at a slant side of a lower end of said process roll at the same positions when one process roll of optional length and optional outer diameter is stood obliquely, and an upper supporting member having two flat surfaces for supporting the two right and left points at a slant side of an upper end of said process roll at the same positions, the lower end of the lower supporting member is provided with a projected roll lower end surface supporting plate for supporting the lower end surface of the process roll in such a way that the lower end of the process roll is not slipped away form the roll supporting surfaces of the lower supporting member, the upper side supporting member is of longitudinal two-surfaces having an obtuse angle at its horizontal sectional view, as the length of the process roll is made short, its inclination is increased to cause a distance in a horizontal direction between the center of gravity and the lower end of the roll to be widely changed and even if a centrifugal force is applied to the process roll at the time of rotation of the turn-table, it rises in an upright direction and it is not fallen more outwardly.

The invention described in the third embodiment provides a plating factory for process roll for a gravure printing characterized in that there is provided a plating line facility having a copper sulphate plating device or a chromium plating device or a nickel plating device or a zinc plating device for use in plating a process roll, further there is provided an industrial robot having a robot hand adjacent to one end of a line of the plating line facility so as to chuck the process roll at its both ends to enable a handling of the roll to be carried out; there is provided, in a handling area of said industrial robot, one or a plurality of turn-table type roll stock devices capable of standing obliquely many process rolls in a circumferential arrangement in one stage or two stages at the roll pallet in such a way that a longitudinal direction of the process roll may be coincided with the generatrix of a conical surface and capable of stopping an optional roll pallet at a predetermined position so as to store or take out the process roll against the roll pallet; the industrial robot takes out the process roll stored at the roll stock device, delivers it to the roll handling means in the plating line facility, and additionally receives the processed process roll from the roll handling means in the plating line facility and stores it at the roll stock device.

The invention described in the fourth embodiment provides a plating factory for process roll for a gravure printing described in the third embodiment characterized in that a grinder stone grinding device is installed at a location near the industrial robot in said plating line facility or outside said plating line facility.

As already been described above, the turn-table type roll stock device described in the first and second embodiment provides, as its object, a plating factory for process roll for a gravure printing and a turn-table type roll stock device preferable to the gravure printing plate manufacturing factory in which many process rolls can be stood in a slant manner and stocked within a handling area of a reciprocatable and rotatable industrial robot enabling a roll warehouse to be conveniently realized within a small space at night, the process rolls can be delivered in a short tact, when the process rolls to be processed at night are stocked before the factory is unmanned at the evening, and some plating steps and plating print-making steps different from each other are inputted in advance in a control device, the process roll is fed into the plating line in sequence one by one under a full-automatic manner in an unmanned state at night, the processing can be carried out at the plating steps and plating print-making steps different for each of the many process rolls and all the number of plated or process rolls can be stocked, all the number of rolls can be taken out tomorrow morning and a quite high operating efficiency can be attained.

The turn-table type roll stock device described in the first and second embodiment can provide a turn-table type roll stock device capable of storing many process rolls having different sizes in a quite small space, and not fallen outwardly even under its rotatable operation; additionally contribute to a substantial reduction of facility cost, a small space formation and an accomplishment of high efficiency in operation of an entire device at the plating factory for process roll for a gravure printing and the gravure printing plate manufacturing factory. A changing-over transferring of the roll between the stock devices can be easily performed through an operation of an industrial robot when a plurality of stock devices are installed. The industrial robot can take out rapidly any roll stocked at any location at the stock device and transfer it to a feeding position for the plating line. A transferring tact for all rolls to which the industrial robot relates, more practically, a transferring tact for transferring the plated roll, a roll being at the midway part of the print-making and the already process roll to the stock device or an device around the robot can be made short and this can contribute to an increased operating efficiency of the entire device.

The plating factory for process roll for a gravure printing described in the third and fourth embodiment is made such that a roll loading/unloading device, a roll stock device capable of storing many process rolls, a relay table device and a grinder stone grinding device are installed within a handling area of a reciprocatable and rotatable industrial robot, in particular, the relay table device and the grinder stone grinding device are installed in the plating line, thereby these devices are stored in the handling area for the industrial robot, the industrial robot can deliver the process roll among these devices, and the roll stock device can be constituted in such a size as one in which many process rolls can be stored;

the gravure printing plate manufacturing factory of the present invention is made such that a roll loading/unloading device, a roll stock device capable of storing many process rolls, a relay table device and a grinder stone grinding device are installed within a handling area of a reciprocatable and rotatable industrial robot, in particular, the relay table device and the grinder stone grinding device are installed in the plating line, a film coating device, a laser exposure device and the roll stock device are optionally stacked up in two stages, thereby these devices are stored in the handling area of the industrial robot, the industrial robot can deliver the process roll among these devices, and the roll stock device can be constructed in such a size as one in which many process rolls can be stored, resulting in that;

it is possible to provide the plating factory for process roll for a gravure printing and a gravure printing plate manufacturing factory in which;

a full-automatic operation can be performed under an attendance of an operator at daytime as well as when the process roll to be processed at night is stored before the factory is set to an unmanned state at evening, and at that time the plating steps and the plating and print making steps different to each other are inputted to the control device, a feeding of the process roll into the plating line can be carried out in sequence one by one under a full-automatic operation in an unmanned state at night, each of the many process rolls can be processed at the plating step and the plating and printing plate making step, respectively, all the plated rolls or process rolls can be stored, all the rolls can be taken out tomorrow morning showing a quite high efficiency in operation.

In addition, the present invention can provide the plating factory for process roll for a gravure printing capable of attaining a substantial reduction in a facility cost, a making of small space and a high operating efficiency of an entire device by employing the turn-table type roll stock device and a rotatable type industrial robot in which many process rolls different in size can be stored in a quite small space and not fallen outwardly even if the roll stock device is turned.

In addition, the present invention can provide the plating factory for process roll for a gravure printing capable of easily changing-over and transferring rolls between the stock devices through application of the industrial robot also in the case that a plurality of stock devices are installed, enabling the industrial robot to rapidly take out even the roll stocked at any location in the stock device and to transfer it to a feeding position into the plating line, capable of shortening a transferring tact for all rolls to which the industrial robot relates, more practically, a transferring tact for transferring the plated roll, the roll at the midway part of print making operation and the already process roll to the stock device or the peripheral device around the industrial robot and capable of increasing an operating efficiency of the entire device by employing the turn-table type roll stock device and the rotatable type industrial robot in which many process rolls having different sizes can be stored in a quite small space, and not fallen outwardly even under its rotatable operation.

In addition, the present invention can provide a plating factory for process roll for a gravure printing capable of inputting in the control device the plating steps and the plating and printing plate making steps different to each other at the time of storing the rolls when the process rolls machined in a cylindrical shape of the cell-image cutting under application of a lathe in an off-line state are applied, capable of avoiding unloading the roll having no superior adhesion of plating at the roll having its processing completed and not becoming a product, in particular capable of processing many process rolls at night in an unmanned state in a full-automatic operation and capable of having a high reliability in operation.

PREFERRED EMBODIMENTS OF THE INVENTION

Figure 1:
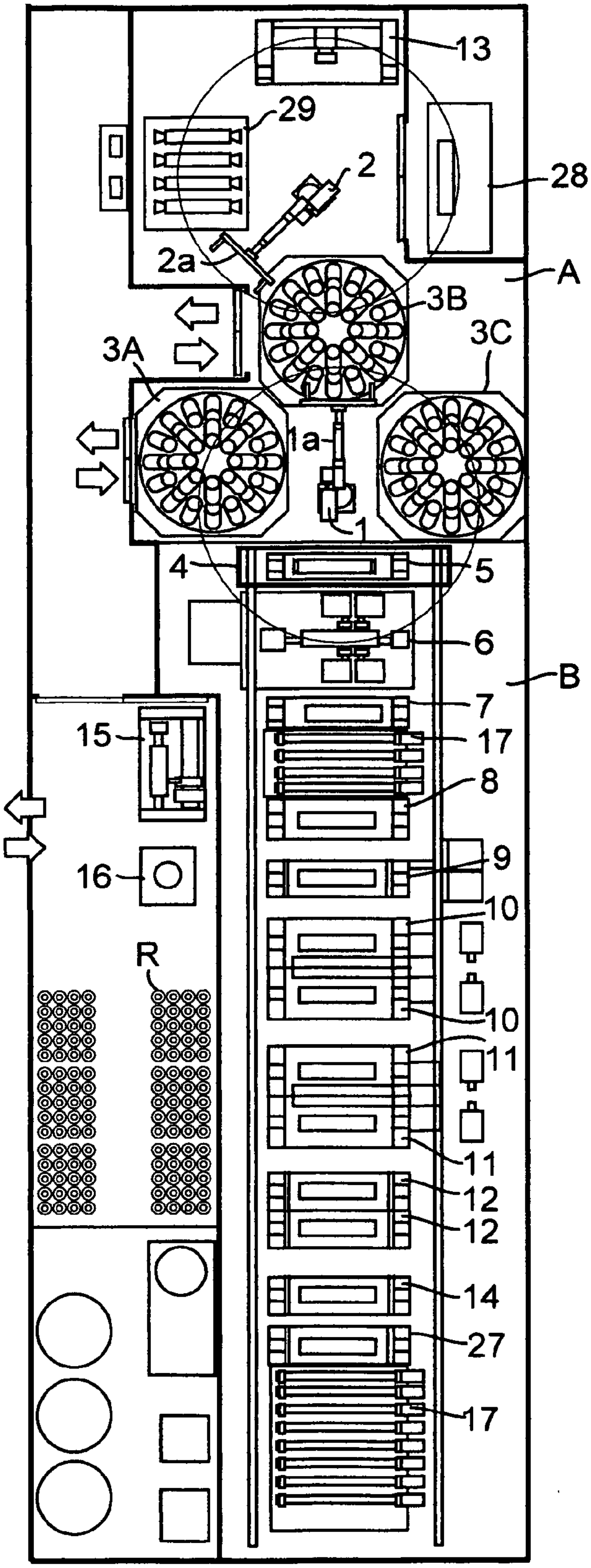
FIG. 1 is a schematic top plan view for showing a plating factory for a gravure printing plate roll of the preferred embodiment including the invention described in claim 1 and claim 2.

Referring now to FIG. 1, the plating factory for process roll for a gravure printing of the preferred embodiment including the invention described in claim 1 and claim 2 will be described as follows.

A facility configuration shown in FIG. 1 indicates a preferable line facility which can adapt for all orders through one line for a printing plate manufacturing company requiring various kinds of plating steps in response to versatile orders of a client. In particular, this facility has no chromium plating device and in place of it, this line facility includes a nickel alloy plating—quenching—thermal radiation cooling.

The plating factory for process roll for a gravure printing in this preferred embodiment is constructed such that a reciprocatable and rotatable industrial robot 1 having a robot hand 1*a* capable of chucking a process roll R at its both ends and handling it is installed at a side near a plating chamber B in a robot chamber A; a reciprocatable and rotatable industrial robot 2 having a robot hand 2*a* which can chuck a process roll R at its both ends and perform its handling is installed at a location spaced apart from the plating chamber B; three turn-table type roll stock devices 3A, 3B and 3C are installed in the handling area of the industrial robot 1; a quenching device 28, a cooling device 29 and a paper grinding device 13 are installed in the handling area of the industrial robot 2; the aforesaid roll stock device 3B is also positioned in the handling area of the industrial robot 2; the plating chamber B adjacent to the robot chamber A has, below a running line of a stacker crane 4 installed at a ceiling, a relay table device 5, a grinding device 6, a photographic waste liquid coating device 7, a degreasing (including a drying) device 8, a nickel under-plating device 9, two copper sulphate plating devices 10, two chromium plating alternative nickel alloy plating device 11, two zinc plating devices 12, a chromium plating dissolution and removing device 14 and a cassette assembling table device 27. Loading/unloading of the process roll can be carried out manually through its storing into and taking-out of the roll stock devices 3A, 3B.

Then, an NC lathe 15 capable of performing a precision cylindrical machining for a cell-image cutting and a roll measuring device 16 are installed as an off-line facility.

A transferring means for the process roll R at the plating chamber is carried out under a cooperative operation between the stacker crane 4 and a cassette type roll chuck rotary transferring unit 17 having a pair of opposed chuck means. The cassette type roll chuck rotary transferring unit 17 is constituted such that the process roll R can be chucked at its both ends by the pair of opposed chuck means and an sealed state can be made outside the chuck corn as disclosed in the gazette of Japanese Patent Laid-Open No. Sho 55(1980)-164095, for example, and further when it is installed at each of the devices, it can be rotated and a plating current can be flowed through the chuck corn as required.

It may also be applicable that in place of the stacker crane 4 and the cassette type roll chuck rotary transferring unit 17, there is provided a reciprocatable and rotatable running type industrial robot having the robot hand 1*a* which can chuck the process roll R at its both ends and handle it, and each of the devices 7 to 12, and 14 is provided with a pair of opposed chuck means capable of chucking the process roll at its both ends, being rotated and flowing a plating current through the chuck corn as required.

Since it is necessary that the relay table device 5 and the grinding device 6 are installed in the handling area of the industrial robot 1, the relay table device 5 and the grinding device 6 may be reverse in their arrangement order while they are mounted in the robot chamber A in closely approached state. Further, it may also be applicable that the grinding device 6 is installed in the robot chamber A while one of the three installed turn-table type roll stock devices is reduced. The devices 7 to 12 and 14 may be arranged in any order.

The facility constitution shown in FIG. 1 can perform various kinds of plating processing as described below. A control device for an entire line has a constitution in which the following processing can be selected through a display unit.

Figure 2:
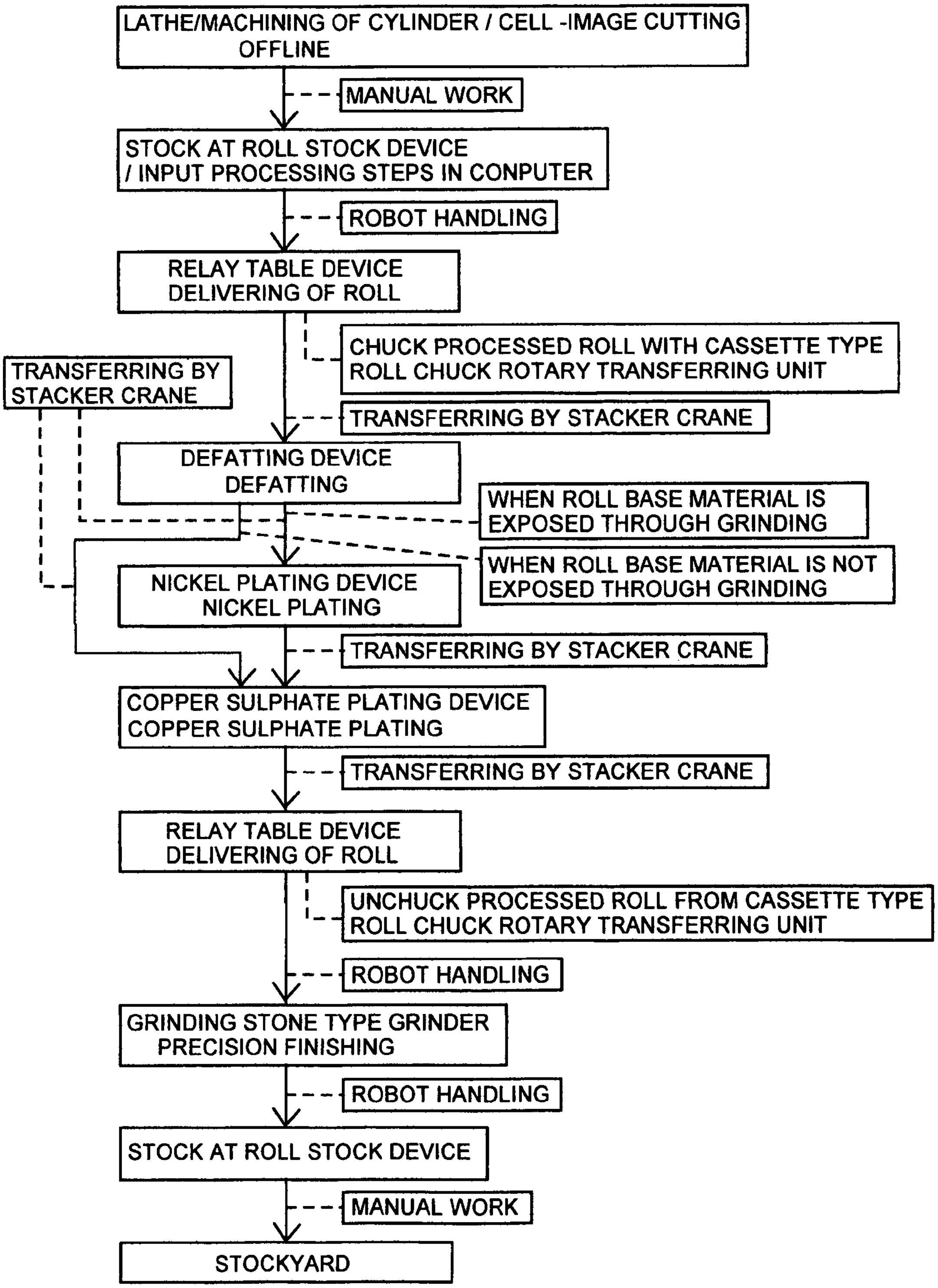
FIG. 2 is a flow chart for showing plating steps capable of being performed at the plating factory shown in FIG. 1.

(1) As to a process roll of a re-use roll of direct printing type in which a roll base material (iron) is exposed while a precision cylindrical machining is carried out by an NC lathe in an off-line state line and cell-image cutting is performed, a degreasing processing is carried out and a nickel under-plating (a under-plating where a copper sulphate plating having a high close adhering force is applied) is applied and a copper sulphate plating is applied and then the precision cylindrical machining is carried out by the grinder stone grinding device and it can be taken out. This processing step is indicated in the flow-chart of FIG. 2.

(2) As to a process roll of a re-use roll of direct printing type in which a roll base material (iron or aluminum) is not exposed while a precision cylindrical machining is carried out by an NC lathe in an off-line state and cell-image cutting is performed, the roll is degreased and a copper sulphate plating is directly applied or a nickel under-plating is applied to it and a copper sulphate plating is applied to it, and then a precision cylindrical machining is carried out by a grinder stone grinding device and the roll can be taken out. This processing step is also indicated in the flow-chart of FIG. 2.

Although the NC lathe can be installed under in-line state, an automatic operation can be attained by installing a system capable of detecting by video systems etc. whether or not the base material (iron or aluminum) is exposed when the precision cylindrical machining is carried out by the NC lathe and image-cutting is performed.

Figure 3:
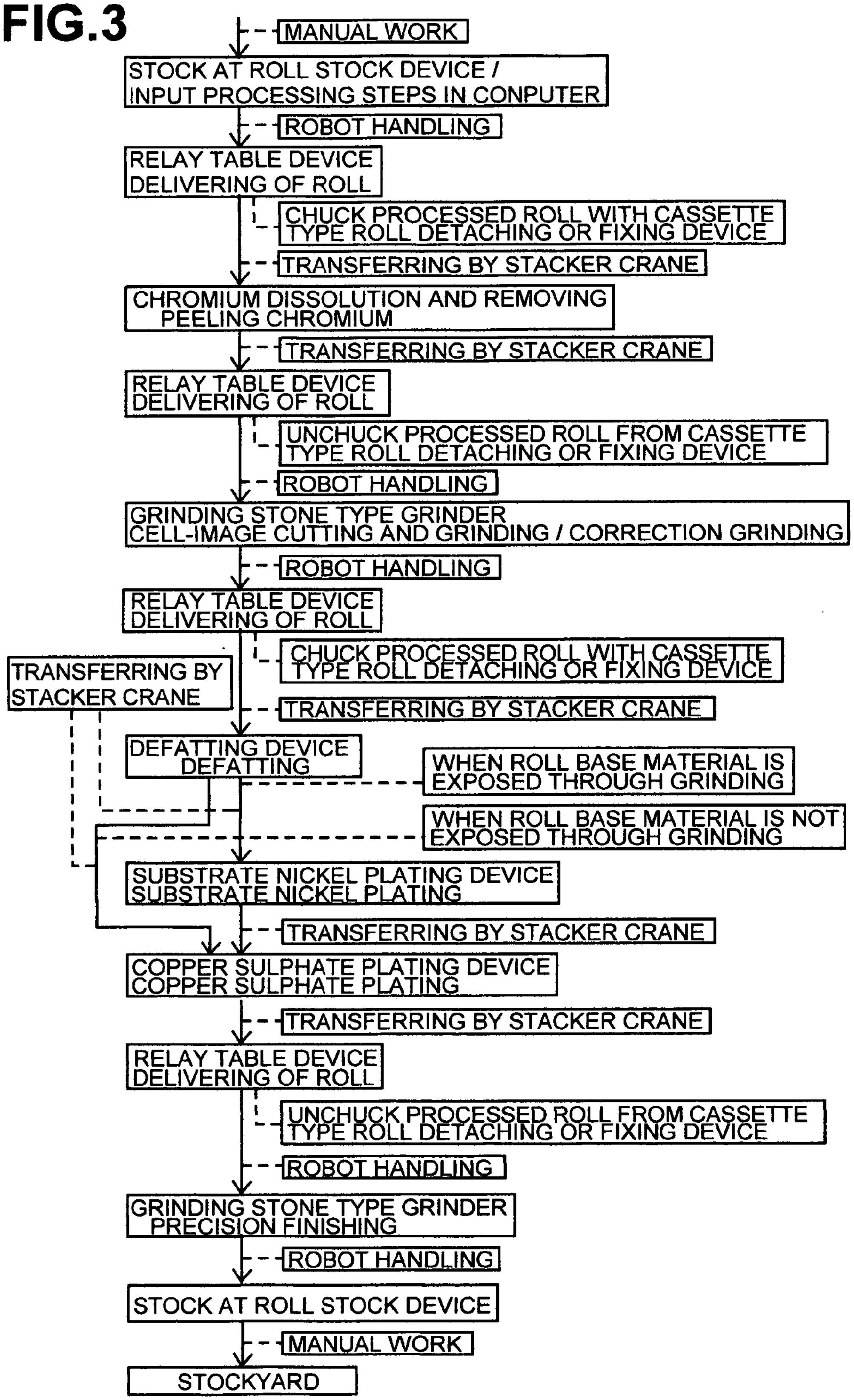
FIG. 3 is a flow chart for showing another plating steps capable of being performed at the plating factory shown in FIG. 1.

(3) In the case that the NC lathe and the roll measuring device are not installed also in an off-line state, as to the direct printing type re-use roll, a precision cylindrical machining by the NC lathe cannot be carried out and cell-image cutting cannot be performed in an off-line state, so that it is possible that the roll is processed for cell-image cutting and correction grinding through the grinder stone grinding, a degreasing processing is carried out, copper sulphate plating is applied to the roll, the precision cylindrical machining is carried out with the grinder stone grinding device and then the roll is taken out. This processing step is indicated in the flow chart of FIG. 3.

Repeating this processing step causes a degree of deformation of the process roll to be increased and at the same time the processing step becomes remarkably elongated as compared with that of precision cylindrical machining with the NC lathe and cell-image cutting and a cost of printing plate is expensive, so that this is not preferable. Accordingly, this processing step is assigned as one applied until the NC lathe and the roll measuring device are installed in the line.

Figure 4:
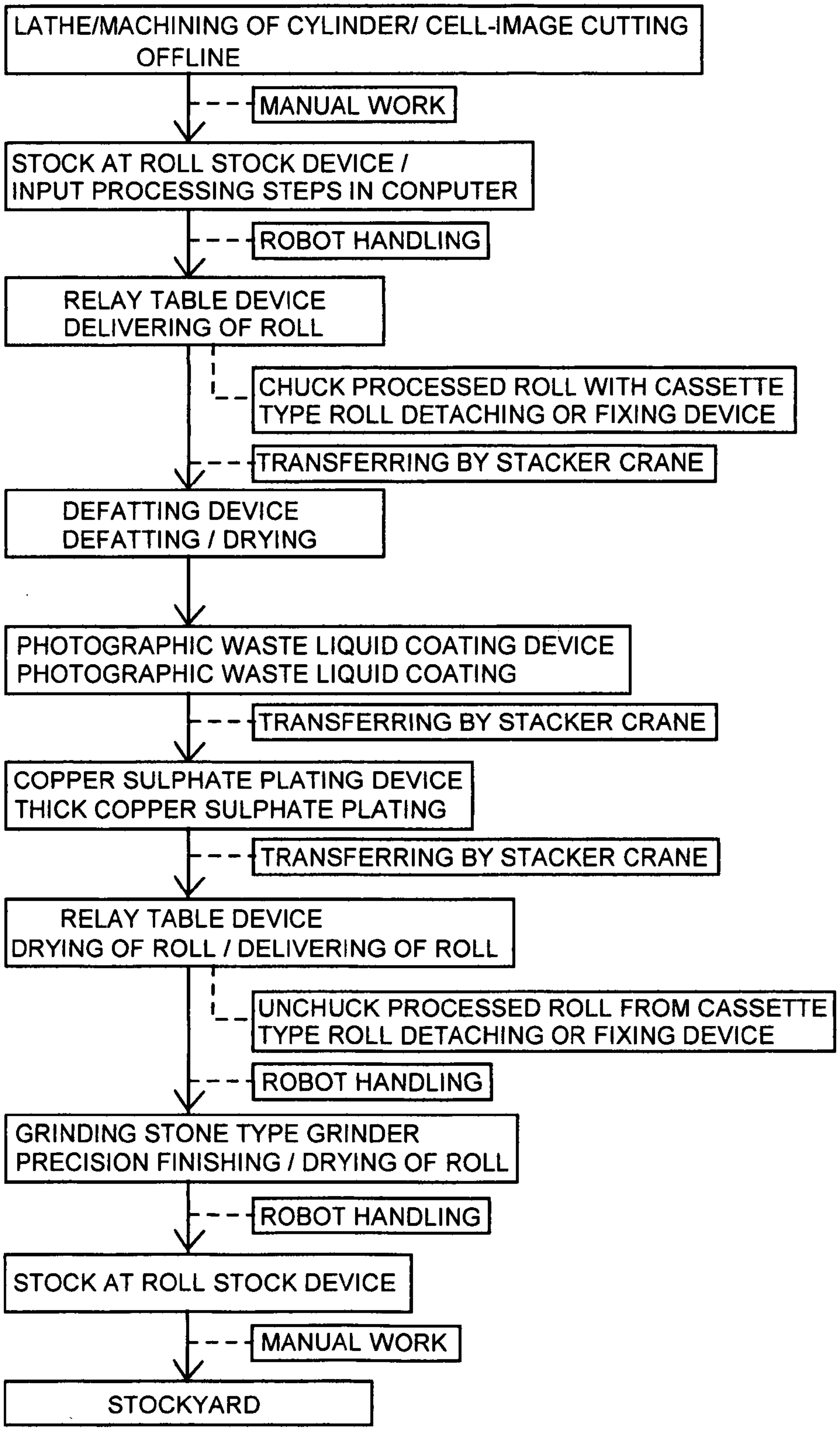
FIG. 4 is a flow chart for showing another plating steps capable of being performed at the plating factory shown in FIG.

(4) In the case that the roll is a ballade plating type re-use roll and the roll cannot be treated as a direct printing type roll under a request from a client, the roll is degreased and a roll surface is coated with photographic waste liquid and its surface state is easily peeled off, and then copper sulphate plating (ballade plating) can be applied in thick. This processing step is indicated in the flow-chart of FIG. 4.

The number of rolls in which the ballade plating type re-use roll cannot be treated as the direct printing type roll is quite low.

(5) As to a process roll of a re-use roll in which zinc plating is applied on copper sulphate plating to have a thickness of 30 μm, for example, it is engraved by an electron engraving machine or a high output laser such as carbonic acid gas laser and the like, thereafter a chromium plating is applied to it, and a precision cylindrical machining by the NC lathe is carried out and cell-image cutting is performed in an off-line state to cause copper sulphate plating to be exposed, the degreasing processing is carried out for the roll, copper sulphate plating is applied, then zinc plating is applied to have a thickness of about 35 μm, for example, 5 μm is cut with the grinder stone grinding device under a precision cylindrical machining and the roll can be taken out. This processing step is indicated in the flow-chart of FIG. 5.

Figure 6:
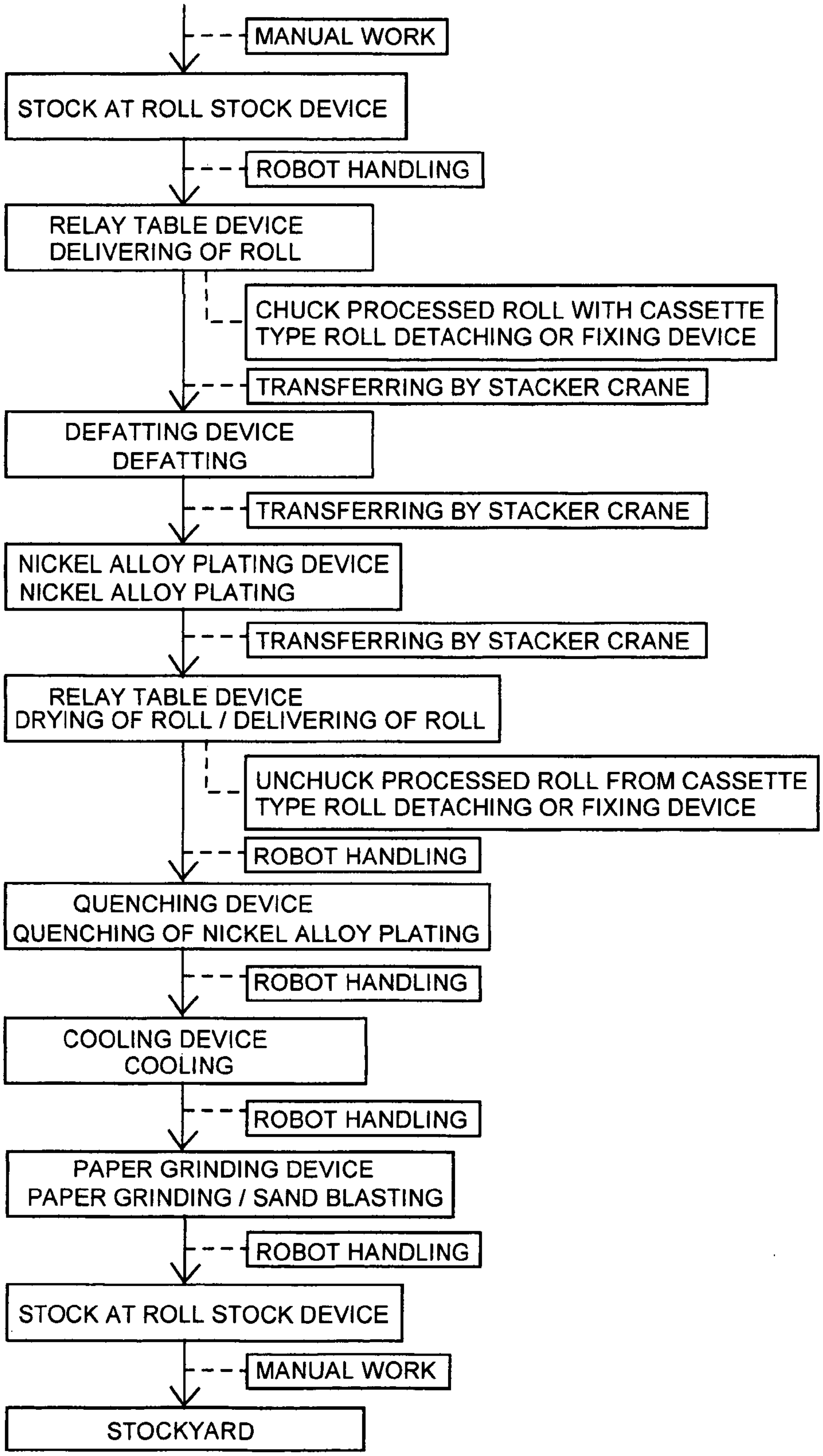
FIG. 6 is a flow chart for showing another plating steps capable of being performed at the plating factory shown in FIG. 1.

(6) As to the process roll having a cell formed, the roll is degreased, a nickel alloy plating in place of chromium plating is applied to the roll and a sand pattern can be applied to it through a paper grinding work. This processing step is indicated in the flow-chart of FIG. 6.

(7) In the case that a re-chromium plating processing is required, i.e. when there are many printed sheets and it is desired to apply again a chromium plating, the chromium plating is dissolved with a chromium plating dissolving and removing device 14, degreasing processing is carried out and then the nickel alloy plating in place of chromium plating can be applied only once. This processing step is in accordance with the flow chart of FIG. 6. Chromium plating dissolving and removing step is set before and after the degreasing processing. When the nickel alloy plating in place of chromium plating is applied again, the plating cannot be applied at the second time. As to the zinc plating roll of (5), the dissolving of the chromium plating and the dissolving of zinc plating are carried out concurrently, so that the chromium plating cannot be dissolved and removed, and nickel alloy plating in place of chromium plating cannot be carried out.

(8) In the case that the roll base material is aluminum and aluminum is exposed through the NC lathe machining operation, copper sulphate plating cannot be applied by the aforesaid facility. However, it can be applied when a pre-processing facility capable of carrying out the nickel under-plating through a zincate prosess or a pre-processing facility capable of performing a pyro-copper phosphate plating through an anodale prosess are added to the plating line.

In particular, the feature of the present invention found in the plating factory shown in FIG. 1 consists in the fact that the industrial robot 1 is not of a running type, but of a reciprocatable and rotatable type, and further found in the fact that three turn-table type roll stock devices 3A, 3B and 3C, the relay table device 5 and the grinding device 6 are installed in the handling area of the industrial robot 1. The grounds for these facts are as follows.

The reciprocatable and rotatable type industrial robot 1 has an advantage that it can be restricted more in view of each of price and installing space than those of the running type industrial robot, respectively, by about ⅓, and then the tact for delivering the roll from one device to the other device can be substantially reduced more than that of the running type industrial robot and its operating efficiency can be increased.

To the contrary, the reciprocatable and rotatable type industrial robot has a small handling area, so that the number of rolls that can be stored at the handling area is reduced. In view of this fact, three turn-table type roll stock devices 3A, 3B and 3C are installed. One unit of turn-table type roll stock device 3A can store about 20 to 40 process rolls having a standard size of a diameter of 200 mm×a length of 1200 mm in its two-stage stock structure.

Even if the industrial robot 1 and three turn-table type roll stock devices 3A, 3B and 3C are not installed, the process roll that is processed in a precision cylindrical machining operation by the NC lathe installed in an off-line state and that is processed by an image-cutting operation is manually lifted up or lifted up by a manipulator and installed on the relay table device 5 and a menu of plating processing is selected by a controlling computer (not shown), resulting in that a desired plating operation is carried out and a finishing grinding is performed. However, in this type of operation, a worker must attend every time one roll is fed into the device, and in particular, many rolls cannot be plated in an unmanned state at night.

To the contrary, when the industrial robot 1 and three turn-table type roll stock devices 3A, 3B and 3C are installed, the process rolls can be stocked manually in sequence against one unit of turn-table type roll stock device 3A and the menu of plating processing can be selected every time at the controlling computer (not shown), and all the processing such as performing of replacing of the roll from the roll stock device 3A to two other units of roll stock devices 3B, 3C carried out by the industrial robot 1 in accordance with a warehouse management; installing of the process rolls stored at any one of the three turn-table type roll stock devices 3A, 3B and 3C on the relay table device 5 under an operation of the industrial robot 1; rerotatable of the process roll plated, finish ground and mounted on the relay table device 5 to any one of the three roll stock devices 3A, 3B and 3C under an operation of the industrial robot 1; and replacing of the process roll plated and finish ground from the roll stock devices 3B and 3C to the roll stock device 3A carried out under an operation of the industrial robot 1 can be performed in accordance with the warehouse management, and the process roll stored at the roll stock device 3A, plated and finish ground can be easily taken out by a manual operation.

Accordingly, only the number of rolls which can be stored at the roll stock devices 3A, 3B and 3C can be plated and finish ground at night in an unmanned state in a full-automatic operation.

Two turn-table type roll stock devices 3A, and 3B can be installed, the grinding device 6 can be removed from the plating line and installed at a location except the roll stock device 3C. In this case, although the length of the plating line becomes short and the number of rolls that can be processed at night is reduced, it is possible to satisfy a requirement of client desiring a less-expensive facility cost. In the case that only one unit of turn-table type roll stock device 3A is installed, a surplus space is produced, so that it can be constituted such that the number of rolls approximating by twice or more can be stored.

Since a surplus space is produced when only one unit of roll stock device 3A is to be installed, it is possible that the grinding device 6 and the NC lathe 15 can be installed at locations except those of the roll stock devices 3B, 3C and further it is possible that the NC lathe 15 can be installed in an in-line state. However, if the NC lathe 15 is installed in an off-line state, it can be acknowledged with naked eyes whether or not the roll base material is exposed through an cell-image cutting and grinding operation. An error can be avoided in the plating processing by arranging a system in which a desired plating is carried out and its finishing and grinding operations are performed when the process rolls are stored at the roll stock device 3A and a menu of performing a plating operation is selected at the controlling computer (not shown).

Subsequently, each of the devices shown in FIG. 1 will be described in brief as follows.

The industrial robot 1 has the robot hand 1*a* capable of chucking the end surfaces except chuck holes at both ends of the process roll R and handling it in a free direction, and capable of chucking the process roll R and reciprocatable and rotatable it by 360°. It is satisfactory that the robot hand 1*a* can chuck locations near both ends of the process roll R. The industrial robot 2 also has a similar constitution. The reciprocatable and rotatable type industrial robot requires ⅓ of cost as compared with that of the running type industrial robot and has a fast handling tact.

Figure 5:
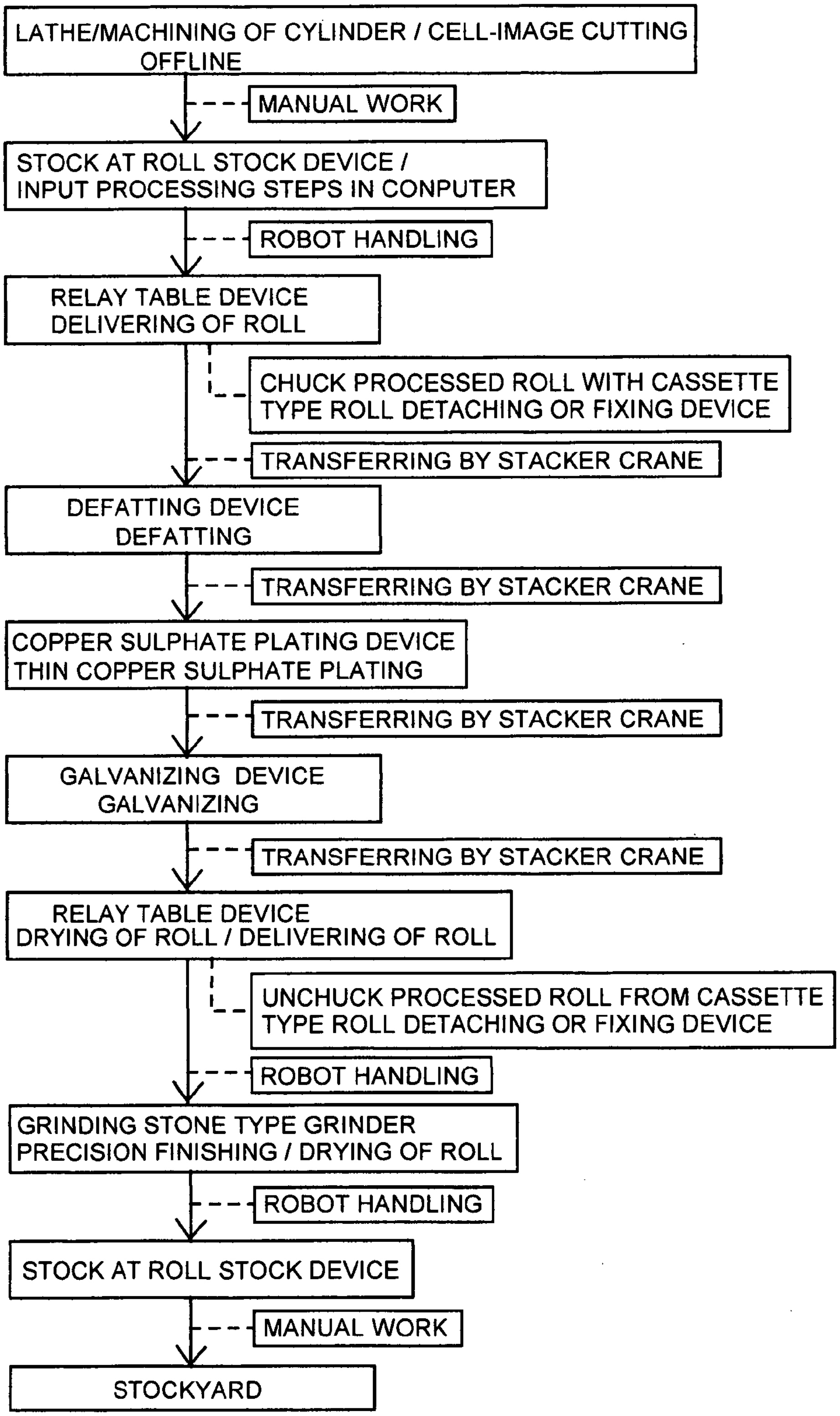
FIG. 5 is a flow chart for showing another plating steps capable of being performed at the plating factory shown in FIG.
Figure 7:
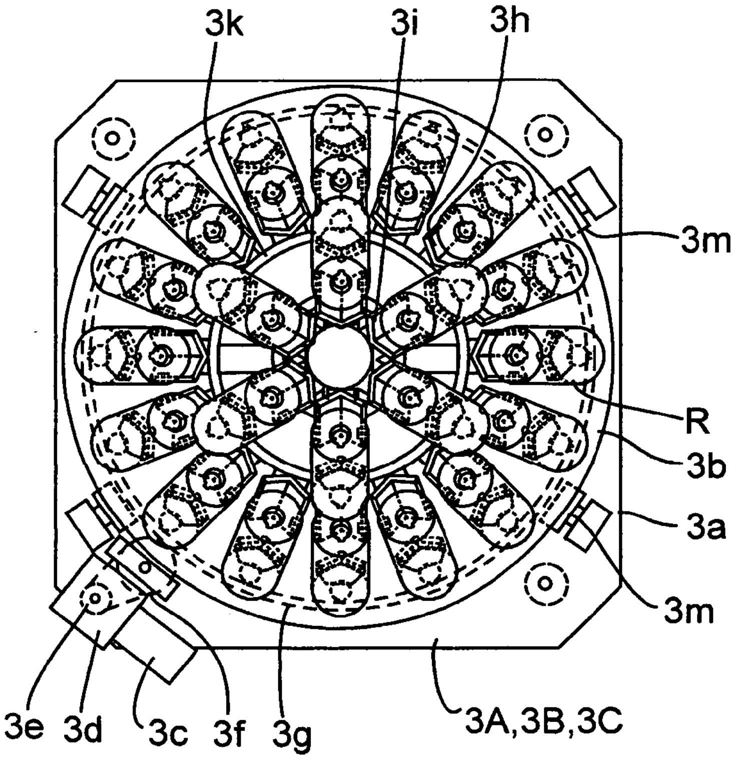
FIG. 7 is a schematic top plan view for showing a roll stock device of a substantial segment at the plating factory shown in FIG. 1.
Figure 8:
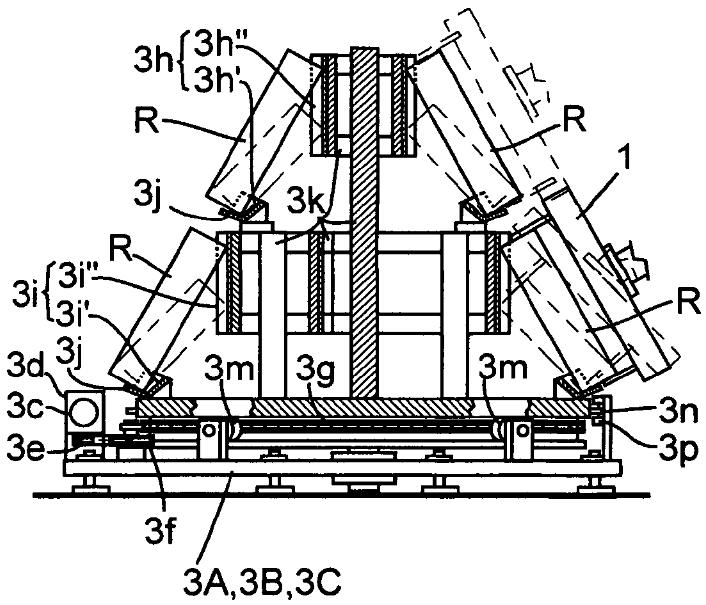
FIG. 8 is a schematic longitudinal sectional view for showing a roll stock device of a substantial segment at the plating factory shown in FIG. 1.

As shown in FIGS. 7 and 8, the turn-table type roll stock devices 3A, 3B and 3C has a structure shown in FIG. 5 in which many process rolls R can be stood obliquely in a circumferential arrangement in two stages at the roll pallet in such a way that the longitudinal direction of the process roll R may be coincided with the generatrix of a conical surface and an optional roll pallet can be stopped at a predetermined position in order to store or take out the process roll against the roll pallet.

As shown in more detail in FIG. 7, a turn-table 3*b* is rotatably arranged against a base plate 3*a*, rotation of a servo-motor 3*c* arranged at the base plate 3*a* is transmitted to an endless chain 3*g* wound around and fixed to the turn table 3*b* through a reduction gear 3*d* and sprockets 3*e*, 3*f* so as to cause the turn-table 3*b* to be rotated. Further, the lower surfaces at four locations at the peripheral part of the turn-table 3*b* are supported by rollers 3*m*, the rollers 3*m* bear a load of the process roll, and a desired one location at the peripheral part of the turn-table 3*b* is position set and fixed by an index engagement device (not shown) installed at the base plate 3*a*.

Then, as shown in FIG. 8, a lower stage roll pallet 3*h* and an upper stage roll pallet 3*i* are installed on the turn-table 3*b*. The roll pallets 3*h*, 3*i* are comprised of lower side supporting members 3*h*', 3*i*' having two flat surfaces receiving the right and left two points at the inclined sides of lower ends of the process roll at the same positions when the process roll having optional length and optional outer diameter is stood obliquely; and upper side supporting members 3*h*", 3*i*" having two flat surfaces receiving the right and left two points at the inclined sides of upper ends of the process roll at the same positions. The lower ends of the lower supporting members 3*h*', 3*i*' are provided with the projected roll lower end supporting plate 3*j* supporting the lower end surface of the process roll R in such a way that the lower end of the process roll R is not slipped away from the roll supporting surfaces of the lower supporting members 3*h*', 3*i*'. The lower supporting member 3*h*' is fixed to the upper surface of the turn-table 3*b*, and the lower supporting member 3*i*' and the upper supporting members 3*h*" and 3*i*" are supported by a frame 3*j* arranged on the turn-table 3*b*.

In particular, this is constituted such that the upper supporting members 3*h*", 3*i*" engaged with the upper end of the process roll are of elongated double-surface member having a horizontal section with an obtuse angle to each other, as the length of the process roll becomes short, the inclination is increased, a distance between the center of gravity and the lower end of the roll (a fulcrum point) in a horizontal direction is substantially varied, and even if a centrifugal force is applied to the process roll when the turn-table 3*b* is rotated, it may raise vertically and it is not further fallen outwardly.

An address plate 3*n* having a desired number of bits enabling an address to be detected is fixed at each of the positions corresponding to the roll pallet at the peripheral part of the turn-table 3*b*, the bit of each of the address plates is read by a sensor 3*p* arranged at a predetermined position at a fixing side, the controller (not shown) discriminates the address read by the sensor, controls the servo-motor 3*c* and can stop the optional roll pallet at a predetermined position.

Accordingly, the optional roll pallet at the lower stage or upper stage can be stopped at a predetermined position in respect to the roll pallet so as to store or take out the process roll.

The stacker crane 4 has a configuration in which the cassette type roll chuck rotary transferring unit 17 can be hung up and transferred. The cassette type roll chuck rotary transferring unit 17 chucks chuck holes at both ends of the process roll R by a pair of chuck corns, shields the outside part of each of the chuck corns by a pair of water-proof caps to water-proof the chuck holes at the both ends of the process roll R. The chuck corn at the driving side is connected to the rotary driving source installed at the processing device when both end plates of the device frame are mounted on the processing device and the process roll R can be rotated. The cassette type roll chuck rotary transferring unit 17 is constructed such that the base portions of the pair of chuck corns are mounted on an electrical energization brush when the end plates of the device frame are mounted on the plating devices 9, 10, 11 and 12, and the plating current is energized (disclosed in the gazette of Japanese Patent Laid-Open No. Sho 55 (1980)-164095).

The industrial robot 1 chucks the process roll R, delivers it onto the four conical rolls of the relay table device 5 and receives the process roll R mounted on the four conical rolls. The stacker crane 4 lifts up the cassette type roll chuck rotary transferring unit 17 and sets it on the process roll R mounted on the four conical rolls of the relay table device 5. Then, the cassette type roll chuck rotary transferring unit 17 chucks both ends of the process roll R, the stacker crane 4 lifts up the cassette type roll chuck rotary transferring unit 17 and transfers it among the devices 7 to 12 and 14.

The devices 5, 7 to 12 and 14 receive both end plates of the device frame of the cassette type roll chuck rotary transferring unit 17 at notch portions, mount the cassette type roll chuck rotary transferring unit 17, and under this state, can perform a fixing or removing, cleaning, drying, degreasing, copper sulphate plating, chromium plating, zinc plating, paper grinding or chromium plating dissolution and removing in respect to the process roll R.

It is preferable to employ, as the grinding device 6, four head grinding device including a rough finishing grinder stone for an cell-image cutting, a middle finishing grinder stone, a fine finishing grinder stone and a mirror surface grinding stone. The grinding device 6 gives or receives the process roll R between itself and the industrial robot 1.

The nickel alloy plating device 11 in place of chromium plating applies a nickel alloy plating of any one of Ni—P, Ni—W and Ni—B to an entire plating surface having a cell formed in it in place of a hard chromium plating holding the prior art plate wear, or applies a nickel alloy plating having fine particles of SiC, Al2O3, TiC and ZrC or the like dispersed in any one of Ni—P, Ni—W and Ni—B in place of chromium plating by about 7 to 8 μm.

Although an electrolysis plating is preferably applied as this plating, non-electrolysis plating may also be applicable.

In the case of plating liquid for use in applying nickel alloy plating of Ni—P, Ni—W or Ni—B in place of chromium plating, each of the predetermined plating liquids (well-known) is used.

In order to perform a composite plating having dispersed fine particles, some fine powder of SiC, $Al_2O_3$, TiC or ZrC are dispersed in the plating liquid for applying the nickel alloy plating of Ni—P, Ni—W or Ni—B in place of chromium plating.

The quenching device 28 performs a heating operation in which the nickel alloy plating plated in place of the prior art hard chromium plating at the entire surface having a cell formed therein has a plate wear in such a way that its Vickers hardness becomes 1,000 or more so as to have a plate wear similar to that of the prior art chromium plating and the roll is heated at 200 to 400° C. so as to cause the Vickers hardness of the nickel alloy plating to become 1,000, or more. When any of Ni—P, Ni—W, Ni—B, Ni—P—SiC, Ni—W—SiC and Ni—B—SiC is heated at 200 to 400° C., its Vickers hardness becomes 1,000 or more, so that it is possible to keep the plate wear similar to that of the chromium plating in place of the prior art chromium plating keeping the plate wear.

In the case of performing a quenching operation to steel, the steel is over-heated to a quenching temperature and rapidly cooled with oil. However, in the case of performing a quenching operation to the nickel alloy plating in place of chromium plating, it is not necessary to perform a rapid cooling after its heating operation and its hardness is increased under a natural cooling after heating operation.

In the case of performing a quenching operation, heating the roll base material to 200 to 400° C. takes a lot of time for its subsequent cooling, so that it is not preferable in general to set the roll in a furnace to perform a heating operation there, and rationally it is preferable that only the layer of nickel alloy plating in place of chromium plating is heated to 200 to 400° C. However, this is impossible because of thermal conductivity, so that it is preferable that a temperature where the roll base material is heated is restricted as low as possible.

Due to this fact, as the quenching device 28, it is preferable to employ a high frequency quenching device capable of performing a local (a surface layer) hardening. In addition, it is also preferable to employ a laser radiation type quenching device in which when a light diameter of high output laser capable of burning and cutting metal is set large and the laser is radiated, only the layer of nickel alloy plating in place of the chromium plating is heated to 200 to 400° C.

The cooling device 29 performs a cooling operation against the process roll where a high frequency quenching was carried out, wherein 4 to 5 process rolls, for example, can be chucked one by one individually at both ends and rotated so as to whip air to promote a natural radiation cooling. As required, it is also applicable that cold air is applied to the roll.

The paper grinding device 13 is applied to the process roll cooled by the cooling device 29, a sand paper is abutted against the process roll chucked at both ends and rotated at a slow speed in an inclined orientation against a longitudinal direction of the roll to perform the reciprocatable operation at a high speed and a sand pattern is applied to the surface of the nickel alloy plating. This processing is carried out for preventing the printing roll from being stained when ink is scraped off with a doctor blade.

Figure 9:
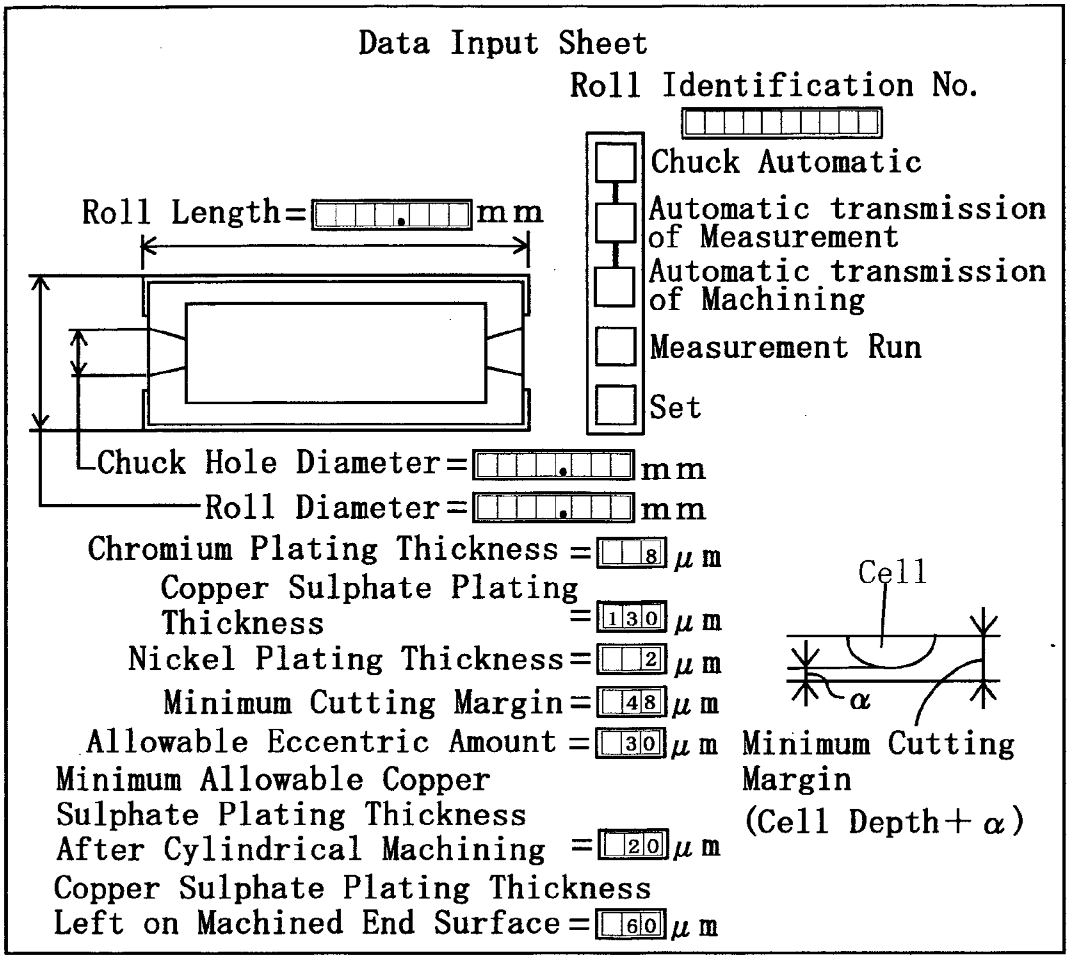
FIG. 9 is a display screen for expressing input values, measured values and calculated values such as a cutting margin and the like used for performing a precision cylindrical machining at an NC lathe.
Figure 10:
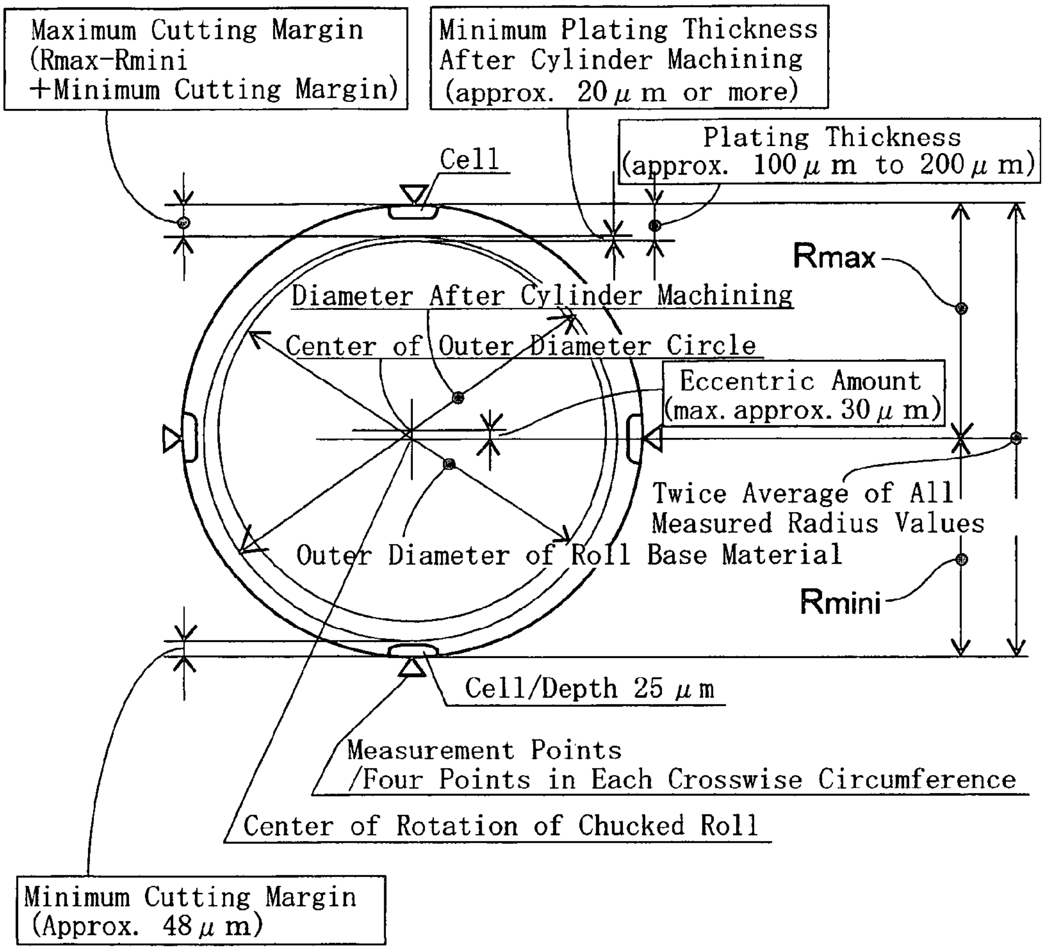
FIG. 10 is a view expressing at a roll section a relation among input values, measured values and calculated values such as a cutting margin and the like used for performing a precision cylindrical machining at an NC lathe.

As shown in FIGS. 9 and 10, the NC lathe 15 is operated such that when some desired sizes are inputted through a computer display, a measurement probe installed at a compound tool rest automatically performs the measurement for multi-points for the process roll R chucked at both ends in a horizontal orientation, a cutting margin is determined and a precision cylindrical machining operation is performed. The precision cylindrical machining is carried out in such a way that a value having a grinding margin ground in a precision cylindrical grinding added to a half value of a difference between a diameter value upon completion of machining at the NC lathe and a diameter value required as a finishing size before chromium plating may become a thickness of the plating assuring the depth of printing plate after performing the NC lathe.

The roll measuring device 16 performs a measurement of an entire length, outer diameter, hole diameter and diameter ranging from one end to the other end of the roll in every specified pitch. Since the NC lathe 15 has a function for measuring the roll, the roll measuring device 16 is arranged for measuring the ballade plating type process roll.

Subsequently, referring now to FIG. 11, the gravure printing plate manufacturing factory of the preferred embodiment including the present invention will be described as follows.

Figure 11:
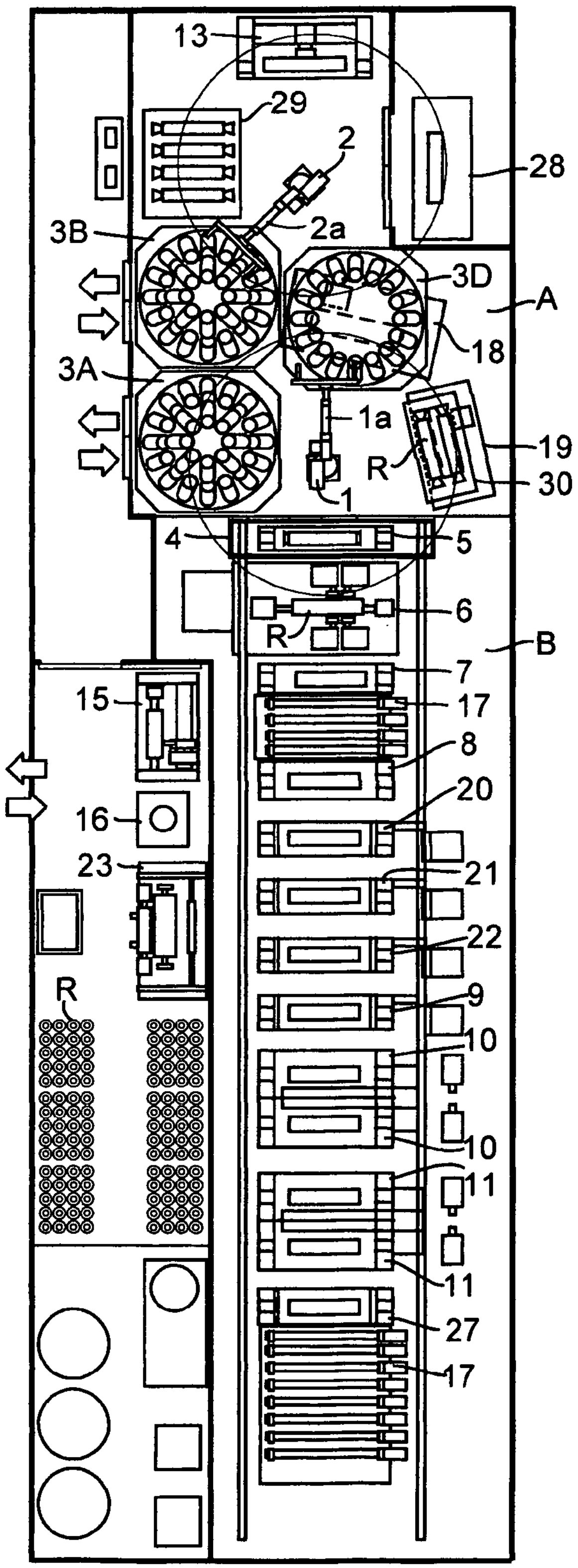
FIG. 11 is a schematic top plan view for showing a gravure plate manufacturing factory of the preferred embodiment including the present invention.

The facility configuration shown in FIG. 11 indicates a preferable line facility capable of manufacturing a printing plate through some steps of forming of a photosensitive film coating—laser exposure and latent image forming—developing—forming of a cell through etching. In particular, the present invention has no chromium plating device and in place of this chromium plating device, this plating factory has a line facility capable of performing a nickel alloy plating—quenching—thermal radiation cooling.

The gravure printing plate manufacturing factory of the preferred embodiment of the present invention is constructed such that the robot chamber A has the reciprocatable and rotatable industrial robot 1 having the robot hand 1*a* capable of chucking both ends of the process roll R and handling it at a side near the plating chamber B; the reciprocatable and rotatable industrial robot 2 having the robot hand 2*a* capable of chucking both ends of the process roll R and handling it placed at a side spaced apart from the plating chamber B; two turn-table type roll stock devices 3A, 3D, either a positive type or negative type photosensitive film coating device 18, a laser exposure device 19 and a photosensitive film drying promoter device 30 being installed in a handling area of the industrial robot 1; the turn-table type roll stock device 3B, the quenching device 28, cooling device 29 and paper grinding device 13 being installed in the handling area of the industrial robot 2; and the plating chamber B adjacent to the robot chamber A has, below the running line of the stacker crane 4 installed at the ceiling of a factory, the relay table device 5, grinding device 6, photographic waste liquid coating device 7, degreasing (including drying) device 8, developing device 20, corrosion device 21, resist peeling device 22, nickel under-plating device 9, two units of copper sulphate plating devices 10, two units of nickel alloy plating devices 11 in place of chromium plating, and cassette assembling type table device 27, respectively.

The roll stock devices 3A, 3B are of a two-stage stock type. The roll stock device 3D is of a one-stage stock type, mounted on the photosensitive film coating device 18 and placed in both handling areas of the industrial robots 1 and 2.

There are provided the NC lathe 15 capable of performing the precision cylindrical machining for the cell-image cutting, the roll measuring device 16 and a proof printing machine 23 in an off-line state.

In addition, it is also applicable that the industrial robot 2, the quenching device 28, the cooling device 29 and the paper grinding device 13 are installed in an off-line state and further it is also preferable that the NC lathe 15 and the roll measuring device 16 are installed in an in-line state.

Transferring means for the process roll R in the plating chamber is carried out under a cooperative action of the stacker crane 4 and the cassette type roll chuck rotary transferring unit 17.

It is applicable that either the grinding device 6 or the NC lathe 15 is installed in the robot chamber A. The devices 7 to 11 can be arranged in any order.

Figure 12:
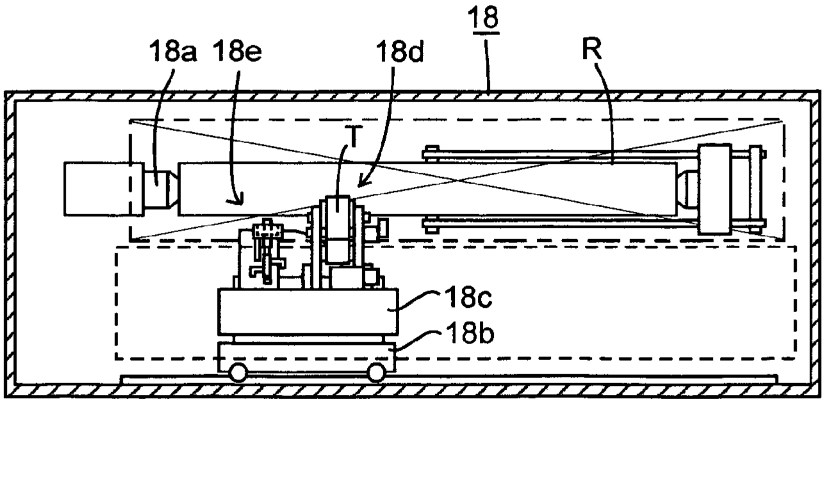
FIG. 12 is a schematic front elevational view for showing a photosensitive film coating device installed at the gravure plate manufacturing factory shown in FIG. 11.

FIG. 12 shows the photosensitive film coating device 18. This photosensitive film coating device 18 is comprised of a roll chuck rotating means 18*a* for chucking both ends of the process roll R and rotating it for forming a coating film; a moving table 18*b* moved along the process roll R; a cleaning head 18*d* arranged at the lifting or descending table 18*c* installed at the moving table 18*b* through a movable bracket; and a coating head 18*e* arranged at the lifting or descending table 18*c*. The cleaning head 18*d* and the coating head 18*e* are arranged in an axial direction of the process roll R. The moving table 18*b* moves from a position corresponding to one end of the process roll R to another position corresponding to the other end of it. The cleaning head 18*c* performs a wiping and cleaning from one end to the other end of the rotating process roll R. The coating head 18*e* chases the cleaning head 18*d* to perform the photosensitive coating and then the rotating operation of the process roll R is continued until the photosensitive film is dried. The coating head 18*e* feeds out a wiping chromium T, wipes and cleans the process roll R. The coating head 18*e* splashes material out of the upper end of a pipe in a slight more volume than the required amount requisite for performing the coating operation and coats the photosensitive film while the pipe being approached to the process roll in a non-contacted state.

The photosensitive film drying and promoting device 30 receives the process roll having the photosensitive film formed by the photosensitive film coating device 18 from the industrial robot 1 and promotes a strong close adherence of the photosensitive film against the process roll.

In the case that the negative type photosensitive agent is coated on the process roll, it is satisfactory that the photosensitive film coating device 18 is kept in a dried state and it is not necessary to perform any special processing for promoting the drying of the photosensitive film.

In the case that the negative type photosensitive agent requiring a burning for increasing a close adhering power after coating operation is coated at the process roll, the photosensitive film drying and promoting device 30 chucks both ends of the process roll, rotates at a slow speed and approaches the heater to cause it to be heated at about 80° C., for example.

Mere drying and fixing it after coating operation causes a close adhering power to be kept high and it is not necessary to improve a close adhering power through the burning operation. However, in the case that a non-heating type negative photosensitive agent requiring adding the specified close adhering power is coated on the process roll, the photosensitive film drying and promoting device 30 chucks both ends of the process roll, rotates at 100 r.p.m, for example, disperses and removes the residual solvent agent in the photosensitive film in such a way that its volume may become 2% or less and a fine film can be formed.

Further, since the photosensitive film drying and promoting device 30 chucks both ends of the process roll to rotate it, it is common with the cooling device 29 and arranging of its layout enables it to be used in common.

The facility configuration shown in FIG. 11 can perform various kinds of print making operation as follows. The control device for the entire line has a configuration in which the following processing can be selected through the display device.

Figure 13:
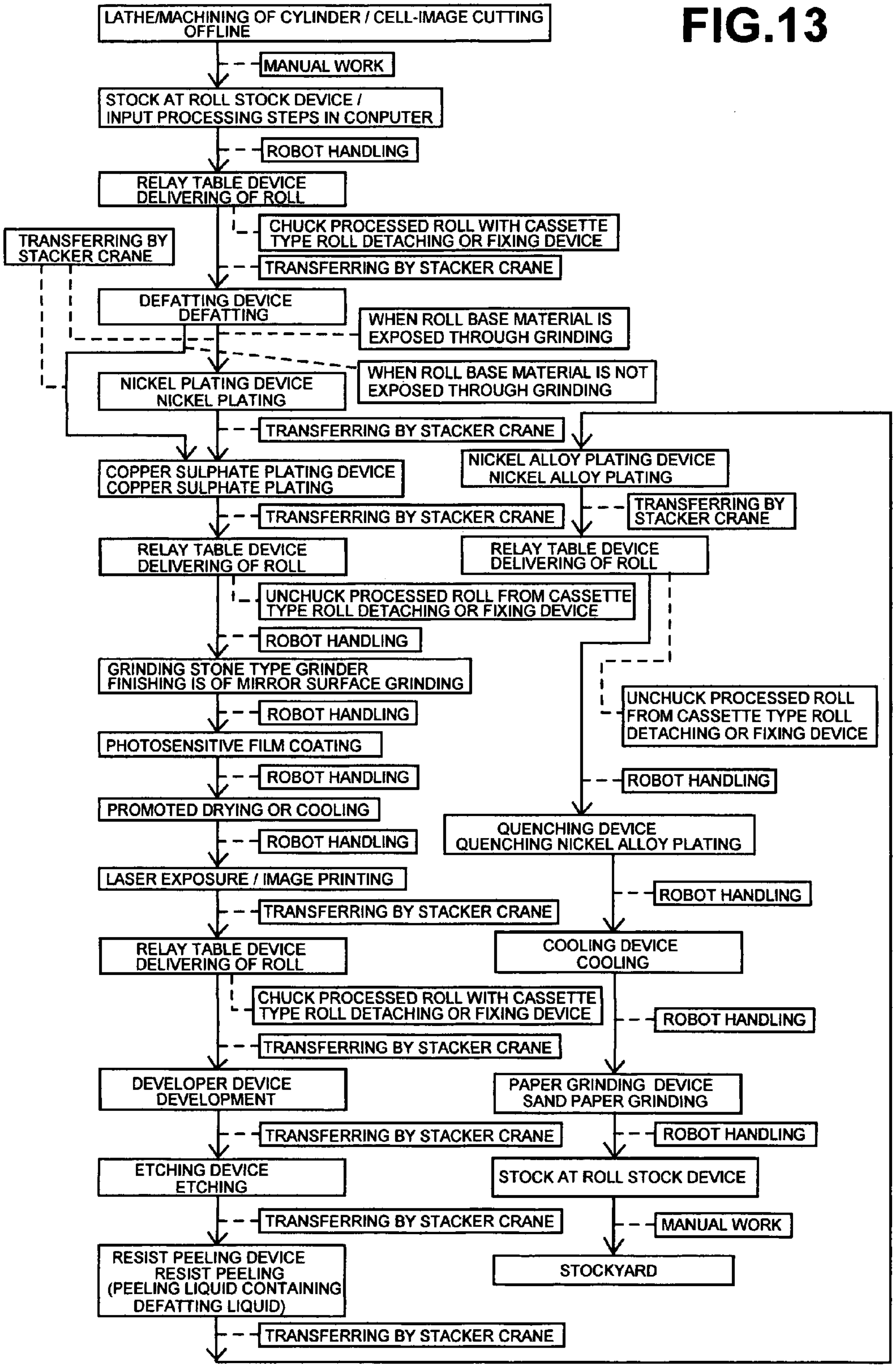
FIG. 13 is a flow chart for showing a plating and plate manufacturing step capable of being performed at the gravure plate manufacturing factory shown in FIG. 11.

(1) As to a process roll of a re-use roll of direct printing type in which a roll base material (iron) is exposed while a precision cylindrical machining is carried out by an NC lathe in an off-line state and cell-image cutting is performed, a degreasing processing is carried out and a nickel under-plating is applied, a copper sulphate plating is applied and then the precision cylindrical machining is carried out by the grinder stone grinding device, the photosensitive film is coated, a latent image is printed with laser exposure, developed, corroded to form a cell, the resist is peeled off, the nickel alloy plating is applied, a quenching is carried out, a cooling (a radiation cooling) is performed, a sand pattern is applied to it through a paper grinding and then the roll can be taken out. This processing step is indicated in the flow-chart of FIG. 13.

(2) As to a process roll of a re-use roll of direct printing type in which a roll base material (iron or aluminum) is not exposed while a precision cylindrical machining is carried out by an NC lathe in an off-line state and cell-image cutting is performed, the roll is degreased and a copper sulphate plating is directly applied or a nickel under-plating is applied to it and a copper sulphate plating is applied to it, and then a precision cylindrical machining is carried out by a grinder stone grinding device, the photosensitive film is coated and formed, a latent image is printed with laser exposure, developed, corroded to form a cell, the resist is peeled off, the nickel alloy plating is applied, a quenching is carried out, a cooling (a radiation cooling) is performed, a sand pattern is applied to it through a paper grinding and then the roll can be taken out. This processing step is also indicated in the flow-chart of FIG. 13.

(3) In the case that the NC lathe and the roll measuring device are not installed in an off-line state, as to the direct printing type re-use roll, a precision cylindrical machining by the NC lathe cannot be carried out and cell-image cutting cannot be performed in an off-line state, so that it is possible that the cell-image cutting and correction grinding are carried out for the roll by the grinder stone grinding operation, the roll is degreased to apply the nickel under-plating (a under-plating), then copper sulphate plating is applied, the precision cylindrical machining is carried out by the grinder stone grinding device, then the photosensitive film is coated on it, a latent image is printed with a laser exposure, developed, corroded to form a cell, the resist is peeled off, the nickel alloy plating is applied, quenching is performed, cooled (radiation cooled), a sand pattern is applied to the roll through a paper grinding and the roll can be taken out. A flow-chart related to the aforesaid operation is not indicated.

(4) In the case that the roll is a ballade plating type re-use roll and the roll cannot be treated as a direct printing type roll under a request from a client, the roll is degreased and a roll surface is coated with photographic waste liquid and its surface state is easily peeled off, and then a thick copper sulphate plating (a ballade plating) is applied, the precision cylindrical machining is carried out by the grinder stone grinding device, the photosensitive film is coated, a latent image is printed with a laser exposure, developed, corroded to form a cell, the resist is peeled off, the nickel alloy plating is applied, quenching is performed, cooled (radiation cooled) and a sand pattern is applied to the roll through a paper grinding and the roll can be taken out.

The turn-table type roll stock device of the present invention is not restricted to such an application in which it is installed at a plating factory for the process roll for a gravure printing shown in FIG. 1 or the gravure printing plate manufacturing factory shown in FIG. 11.

The invention claimed is:

1. A roll stock apparatus for gravure printing comprising:

a turn-table rotatable arranged against a base plate, a plurality of process rolls standing obliquely in a circumferential arrangement in one stage or two stages at a roll pallet, said roll pallet being located on the turn-table, wherein a longitudinal direction of the process rolls coincides with a generatrix at a conical surface, and wherein said roll pallet can be stopped at a predetermined position to store or take out the process rolls against the roll pallet.

2. The roll stock apparatus according to claim 1, wherein the roll pallet comprises a lower and upper supporting member each having two flat surfaces for supporting a lower and upper end of said process roll respectively, when said process roll stands obliquely, wherein the lower supporting member comprises a supporting plate for supporting the lower end surface of said process roll and preventing said process roll from slipping away from the lower supporting member, and wherein the upper supporting member, engaged with the upper end of said process roll, comprises an elongated double-surface member having a horizontal section with an obtuse angle to each other, wherein, as the length of said process roll is decreased, the inclination of said process roll is increased to cause a distance in a horizontal direction between the center of gravity and the lower end of said process roll to change, and wherein, even if a centrifugal force is applied to the process roll due to the rotation of the turn-table, it rises in an upright direction and it is not fallen more outwardly.

3. A plating factory for a process roll in gravure printing, said factory comprising:

a plating line facility having a copper sulphate plating device or a chromium plating device or a nickel plating device or a zinc plating device for use in plating a process roll, an industrial robot having a robot hand adjacent to one end of a line of the plating line facility to chuck the process roll at both its ends to enable the handling of the roll to be carried out, a handling area of said industrial robot, one or more of the roll stock apparatus according to claim 1, wherein the industrial robot (1) takes out the process roll stored at said roll stock apparatus, (2) delivers the process roll to a roll handling means in the plating line facility, (3) additionally receives the process roll from said roll handling means in the plating line facility and (4) stores said process roll at the roll stock apparatus.

4. The plating factory for a process roll in gravure printing according to claim 3, wherein a grinder stone grinding device is installed at a location near the industrial robot in said plating line facility or outside said plating line facility.

* * * * *